United States Patent [19]

Palm

[11] 4,083,112
[45] Apr. 11, 1978

[54] CLAMP ARRANGEMENT FOR CLAMPING SAW BLADES TO THE BLADE HOLDER OF A POWER DRIVEN SAW

[75] Inventor: Bernhard Palm, Fallston, Md.

[73] Assignee: The Black and Decker Manufacturing Company, Towson, Md.

[21] Appl. No.: 747,906

[22] Filed: Dec. 6, 1976

[51] Int. Cl.² .............................................. B26B 1/00
[52] U.S. Cl. ...................................... 30/335; 30/392; 279/67; 279/83
[58] Field of Search ................ 30/329, 335, 337, 392, 30/393, 394; 279/83, 86, 76, 67

[56] References Cited

U.S. PATENT DOCUMENTS

| 1,969,827 | 8/1934 | Tautz | 279/67 X |
| 1,984,500 | 12/1934 | Tautz | 30/329 UX |
| 2,722,244 | 11/1955 | Schultz | 30/394 |
| 2,735,685 | 2/1956 | Karr | 30/392 UX |
| 3,050,093 | 8/1962 | Jepson | 30/394 |
| 3,097,430 | 7/1963 | Lewinski et al. | 30/392 |
| 3,186,726 | 6/1965 | Wilhelm et al. | 279/83 |
| 3,373,779 | 3/1968 | Taft | 30/394 |
| 3,461,732 | 8/1969 | Gregory | 30/393 UX |

Primary Examiner—Gary L. Smith
Assistant Examiner—J. T. Zatarga
Attorney, Agent, or Firm—Walter Ottesen; Edward D. Murphy; Leonard Bloom

[57] ABSTRACT

A clamp arrangement for clamping saw blades to the blade holder of a power driven saw includes a seating surface formed on the end portion of a blade holder of the power driven saw for receiving the saw blade thereon. A collar surrounds the end portion of the blade holder and the shank portion of the saw blade. A threaded annular member threadably engages the collar and presses the saw blade against the seating surface and the end portion of the blade holder is, in turn, pressed against the inside wall surface of the collar. A clear passage through the annular member facilitates access to the shank portion of the saw blade held between the annular member and the seating surface whereby the shank portion can be easily removed from between the annular member and the receiving surface with the aid of an instrument passed through the clear passage in the event the blade should break off at the shank.

21 Claims, 6 Drawing Figures

CLAMP ARRANGEMENT FOR CLAMPING SAW BLADES TO THE BLADE HOLDER OF A POWER DRIVEN SAW

BACKGROUND OF THE INVENTION

The invention is directed to an improved clamping arrangement for clamping the saw blades of a power operated saw.

The clamping arrangement of power driven saws such as reciprocating saws are often disposed within a housing with the blade protruding outwardly therefrom. A problem is often encountered when it is necessary to insert a new saw blade into the clamping arrangement or where an existing blade has broken off at the shank. Usually only a narrow slot is provided in the housing for allowing access to the fastening bolt of the clamping arrangement and this opening in the housing is hardly sufficient to enable the operator of the saw to get at a blade shank where the blade has broken off. Also, difficulty is experienced by the operator should the fastening bolt loosen from the fastening nut.

It is especially advantageous to be able to interchange blades quickly when the reciprocating saw is at a job site as valuable labor time can be saved if saw blades can be interchanged rapidly.

It is desirable too that the saw blade be as strong as possible at the location of the clamping arrangement. Considerable strength, cost and reliability advantages are afforded if the end portion of the reciprocating shaft which constitutes part of the clamping arrangement can be integral with the shaft.

Accordingly, it is an object of my invention to provide an improved and more reliable clamping arrangement for clamping saw blades to the saw blade holder of a reciprocating power saw. More specifically, it is an object of my invention to provide such a clamp arrangement which facilitates the rapid interchange of saw blades and also enables a shank portion of a broken saw blade to be easily removed even though the clamping arrangement is located within the housing of a power driven saw.

It is still another object of my invention to provide an improved clamp arrangement wherein the saw blade holder of the power driven reciprocating saw need only be minimally modified to obtain a seat for the saw blade shank.

SUMMARY OF THE INVENTION

The clamp arrangement according to the invention is suitable for clamping blades to the saw-blade holder of a power driven saw such as a reciprocating saw for example. The clamp arrangement includes surface means formed on the end portion of the saw-blade holder of the power driven saw for receiving the saw blade thereon. Surface means can be formed, for example, by taking a tubular saw-blade holder and modifying the end portion thereof by cutting away a half section of the tubular member. The surface means is then defined by the longitudinally extending cut wall portions of this end portion. A collar is provided which surrounds the end portion of the saw-blade holder. Securing means engages the collar for pressing the shank portion of the saw blade against the cut wall portions and, the end portion is, in turn, pressed at its outer surface against the inner wall of the collar by this securing means.

According to another feature of the invention, the securing means can be a threaded annular member having a clear passage extending therethrough for facilitating access to the shank of the saw blade held between the annular member and the surface means whereby the shank can be easily removed from between the annular member and the surface means with the aid of an instrument passed through the clear passage in the event that the saw blade should break off at the shank.

According to still another feature of the invention, a clamping plate can be provided between the securing means and the surface means with the saw-blade shank being inserted between the clamping blade and the surface means. When the securing means is provided with a clear-through passage, the clamping plate is preferably also provided with an opening which is substantially in line with this passage thereby permitting the operator to get access to the shank portion with a long thin instrument for removing the shank should the blade be broken off at the shank.

The clamp arrangement is especially advantageous when it is utilized in combination with a reciprocating power saw having a housing arranged in surrounding relation to the sawblade holder. In such a combination, it is a feature of the invention to provide access means formed in the wall of the housing at the immediate vicinity of the securing means of the clamp arrangement thereby facilitating access through the housing to the securing means. If the securing means is provided with a clear-through passage and the clamping plate is also provided with an opening, then access can be had to the shank portion of the saw blade from outside the housing of the power driven saw.

The clamping arrangement according to the invention finds application in portable electric power tools such as the Cut-Saw all purpose reciprocating saw manufactured and sold by The Black and Decker Manufacturing Company, Towson, Maryland, 21204.

The foregoing objects and advantages of my invention will become more apparent from consideration of the detailed description to follow taken in conjunction with the drawing annexed hereto.

DESCRIPTION OF THE PREFERRED EMBODIMENT OF THE INVENTION

Figure 1:
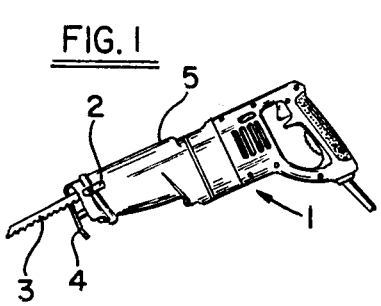
FIG. 1 is a perspective view of a power driven reciprocating saw wherein the clamping arrangement is located within the housing.

FIG. 1 illustrates a reciprocating saw 1 wherein the clamping arrangement is disposed inside the housing of the saw. A window 2 is formed in the housing 5 of the saw. Reference numeral 4 designates a shoe which is mounted at the cutting end of the saw and reference numeral 3 designates the saw blade.

Figure 2A:
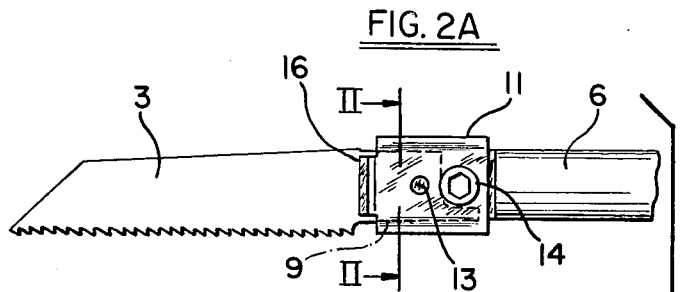
FIG. 2A illustrates a prior art clamping arrangement which has been utilized in reciprocating saws.
Figure 2B:
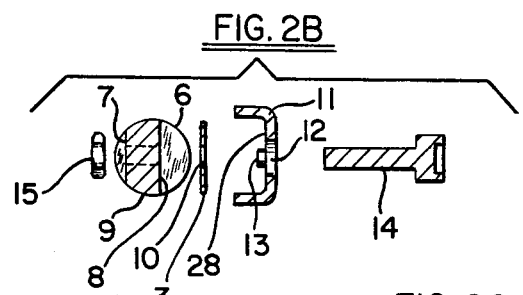
FIG. 2B is an exploded view of the clamping arrangement of FIG. 2A taken along line II—II.
Figure 2C:
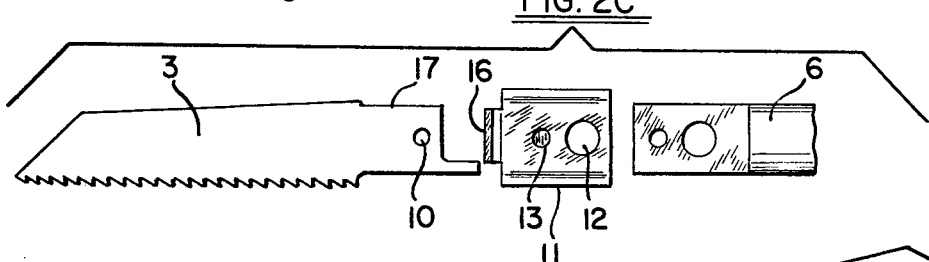
FIG. 2C is a longitudinal exploded view of the clamping arrangement of FIG. 2A.

FIG. 2A to 2C illustrate a prior art clamping arrangement wherein the saw-blade holder is made of cylindrical solid bar stock 6 with two flat surfaces 7 and 8 machined on the end-portion 9. A clamping plate 11 is provided having a hole 12 formed therein as well as a small projection 13 formed thereon. The saw blade 3 is clamped between the end-portion 9 and clamping plate 11 and secured in place with the aid of the projection 13 which is accommodated in hole 10 of the saw blade. The bolt 14 and nut 15 secure the saw blade to the end-portion 9 in combination with the plate 7. The projection 13 is received in opening 10 in the saw blade 3 and helps stabilize and position the blade. The raised portion 16 aids in guiding the blade shank 17 into the clamping arrangement. The saw blade 3 is tightened in place by passing an allen wrench through the window 2 of the housing 5 of the reciprocating saw 1 and tightening the bolt 14.

Experience has shown that the above described prior art clamping arrangement has provided considerable difficulty to the operator of the tool and provides unsatisfactory clamping performance because the saw blades tend to work loose during operation of the reciprocating saw.

Since the clamping arrangement is disposed within the housing 5 of the reciprocating power saw 1, it is somewhat difficult to position the blade 3 when it is inserted by the operator from the front end of the power saw because difficulty is experienced in getting the projection 13 to line up with the hole 10 in the saw-blade shank 17. In addition, there is the problem of removing a shank portion should the saw blade break off at the shank. Through the window 2 no access is provided by means of which the operator can get at the shank portion because the clamping plate 11 and bolt 14 are in the way. If one would remove the bolt 14, of course access would be had to the shank portion 17; however, it would be rather difficult to get the nut 15 back on the bolt 14 from the front end of the saw. About the only practical way of getting the broken shank portion 17 out of the housing 5 is either shaking it loose or removing it with the aid of, say, a pair of needle-nose pliers.

Difficulty is also encountered when removing a worn but unbroken saw blade because a wax-like rust preventative coating which is usually applied to the blades tends to cause the shank portion to stick to the clamp plate 11 after the latter is loosened making it difficult to disengage the projection 13 from the hole 10 in the shank portion 17 of the blade 3.

A disadvantage is also encountered when a replacement blade is inserted because the bolt 14 limits the depth to which the shank of the saw blade can be inserted and hence the length of the shank which can be clamped.

In addition, there are manufacturing difficulties because the end-portion 9 of the stock bar constituting the reciprocating shaft 6 must be specially machined and heat treated. The machining weakens the end-portion 9 of the saw-blade holder 6 as well as makes necessary expensive additional machining steps to form the flat portions 7 and 8 on the end-portion 9 as well as the holes therein for projection 13 and bolt 14.

Figure 3:
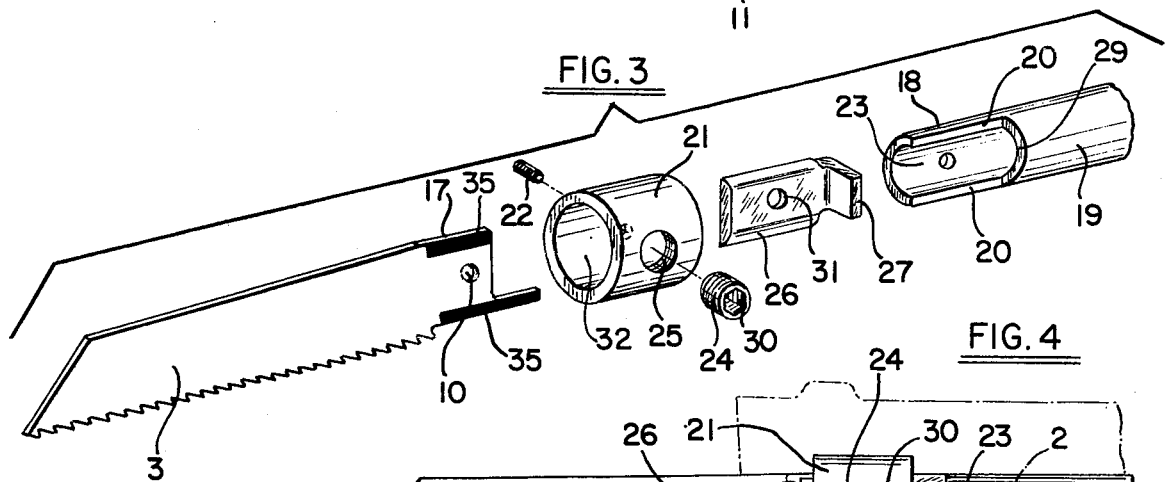
FIG. 3 is an exploded view of the clamping arrangement according to the invention; and, FIG. 4 is an elevation view showing the clamping arrangement according to the invention mounted within the housing of a reciprocating power driven saw.

Referring now to FIG. 3, the clamping arrangement according to the invention includes a cut-away end portion 18 of the tubular blade holder 19 of a reciprocating power saw. The cut wall surfaces 20 constitute surface means for receiving the shank portion 17 of the saw blade 3 thereon. A collar 21 fits over the end portion 18 and is held thereon with the aid of pin 22 which is accommodated in a pin hole 23 of the end portion 18 so that the collar 21 is loosely held on the end portion 18.

Securing means in the form of a threaded member 24 threadably engages the collar 21 at opening 25 therein. The threaded member can be tightened against the saw-blade shank portion 17 to hold the same tightly in the clamp. However, it is preferable to interpose a clamping plate 26 which is over the shank portion 17. The plate 26 is trapped with the aid of bent portion 27 thereof in the collar 21 so as to be loosely held therein when the blade is not clamped. The plate 26 cannot be removed unless the collar 21 and pin 22 are first removed. Because the plate 26 is trapped in this manner, it will not fall out of the tool when the securing means 24 is loosened for exchanging blades.

The clamping plate 26 distributes the clamping force from the set screw 24 to the longitudinally outward portions of the blade shank 17; these outward portions are shown shaded in FIG. 3 and are designated by reference numeral 35. In this way, the blade is held at its edge portions 35 on both sides thereof between the clamping plate 26 and the cut-away wall portions 20 of the saw-blade holder. Loading the blade shank 17 at the edge portions 35 thereof ensures that the blade will be held securely and tightly against the cut-wall portions 20.

In contrast, the prior art clamping arrangement according to FIGS. 2A to 2C is configured such that the shank portion of the blade is held between two flat surfaces, namely: the flat surface 8 on end-portion 9 and the inside surface of the clamp 7. If it were not for the projecting portion 13 on the inside surface 28 of plate 11 in engagement with the opening 10 in the saw-blade shank, the blade would tend to shift positions.

Referring again to FIG. 3, it is noted that the clamping space between the clamping plate 26 and the cut-away wall portions 20 is completely clear the entire distance back to the transverse wall 29 of the saw-blade holder 19. This greatly facilitates insertion of a replacement saw blade since the blade shank can be inserted to abut against the wall 29 thereby locating the blade in the clamp. A further advantage afforded by the instant invention is that the end portion 18 is an integral part of the reciprocating shaft 19 and therefore affords very substantial strength and reliability at the end portion where the blade is clamped.

Further, the seating surface for the blade shank 17 is easily formed by merely cutting away a longitudinal portion of the tubular stock from which the saw-blade holder 19 is made. On the other hand, the prior art clamping arrangement of the type shown in FIGS. 2A to 2C requires an end portion which must be specially shaped to provide a flat portion 7 for the nut 11 as well as the flat portion 8 for accommodating the blade shank 17 thereon.

According to another feature of the invention, the clamping plate 20 and the cut-away wall portions 23 can both be made sufficiently long so that they mutually hold the saw blade also at a location beyond the shank portion where the saw blade has a greater cross-section. At this location the blade has a greater resistance to bending thereby reducing the tendency for the blade to break.

According to still another feature of the invention, the securing means can be a threaded annular member such as a hollow set screw 24 provided with a clear-through passage 30. The clamping plate can also be provided with an opening 31 substantially in line with the passage 30. The hollow set screw 24 then presses against the plate 26 about the periphery of this opening 31 thereby, in turn, sandwiching the shank portion 17 between end-portion 18 and clamping plate 26. The set screw 24 is provided with a hexagonal opening for accommodating an allen wrench whereby the set screw can be tightened against the plate 20. When the blade 3 is clamped, the end portion 18 of the shaft 19 is held tightly against the inside wall surface 32 of collar 21. Also, it should be noted that the application of the load pressure of the set screw 24 about the periphery of opening 31 distributes this pressure load on the plate 26 so that not all of this load is applied at the weakest cross-section thereof, namely, on a transverse line through the diameter of the opening 31.

Figure 4:
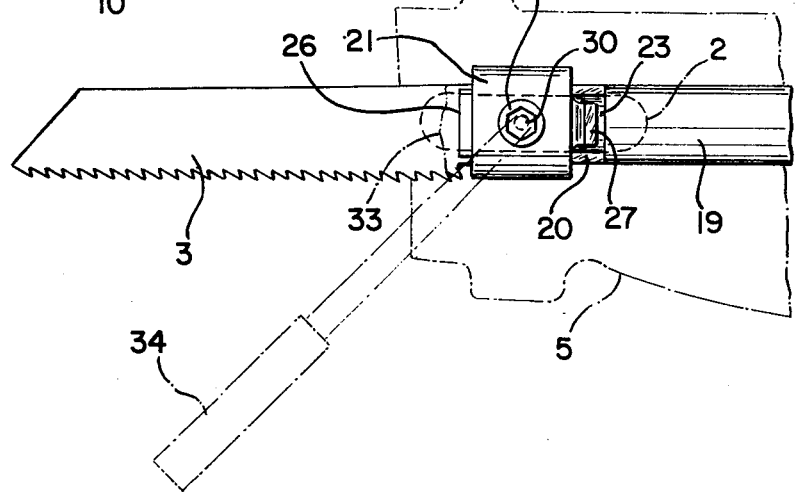

FIG. 4 illustrates the clamping arrangement according to the invention adapted to a power driven saw having a motor driven reciprocating saw-blade holder. A housing 5 is arranged in surrounding relation to the saw-blade holder 19. A window 2 is formed in the housing 5 of the saw at a location adjacent to the clamp arrangement. Should it be necessary to change a saw blade, the operator merely inserts an allen wrench into the set screw 18 and loosens the set screw 24 so that the saw blade 3 can be withdrawn. However, should it happen that the saw blade is broken at the shank 17, say along line 33, the operator merely inserts a pointed instrument such as an awl 34, for example, through opening 2 in the housing and then through the passage 30 and the opening 31 in the set screw 24 and plate 26, respectively. The operator then merely pushes the shank portion 17 out from between the clamping plate 26 and cut-wall portions 20.

I claim:

1. A clamp arrangement for clamping blades to the blade holder of a power driven saw comprising:
    surface means formed on the end portion of the blade holder of the power driven saw for receiving the saw blade thereon;
    collar means surrounding said end portion of the blade holder and the saw blade; and,
    securing means engaging said collar for pressing the saw blade and said end portion against the inside wall surface of said collar thereby pressing the blade tightly between said securing means and said surface means; said securing means being an annular member defining a clear passage therethrough for facilitating access to the shank portion of the saw blade held between said securing means and said surface means whereby said shank portion can be easily removed from between said securing means and said surface means with aid of an instrument passed through said clear passage in the event the saw blade should break off at the shank.

2. A clamp arrangement for clamping blades to the blade holder of a power driven saw comprising:
    surface means formed on the end portion of the blade holder of the power driven saw for receiving the saw blade thereon;
    a clamping plate for clamping the blade to said surface means;
    a collar surrounding said end portion of the blade holder and saw clamping plate; and,
    securing means engaging said collar for pressing said clamping plate and said end portion against the inside wall of said collar thereby pressing the blade tightly between said clamping plate and said surface means; said securing means being an annular member defining a clear passage therethrough;
    said plate having an opening formed therein substantially in line with said passage thereby facilitating access to the shank portion of the saw blade held between said clamping plate and said surface means whereby said shank portion can be easily removed from between said clamping plate and said surface means with aid of an instrument passed through said clear passage and said opening in said plate in the event the saw blade should break off at the shank.

3. A clamp arrangement for clamping blades to the annular saw-blade holder of a power driven saw comprising:
    surface means formed on the end portion of the blade holder of the power driven saw for receiving the saw blade thereon; said end portion being defined by a cut-away section of said annular member, said cut-away section defining two spaced apart cut wall portions of the annular saw-blade holder, said cut wall portions being said surface means and extending in the longitudinal direction of the saw-blade holder;
    a clamping plate for clamping the blade to said surface means, said clamping plate being coextensive with said spaced apart cut wall portions;
    a collar surrounding said end portion of the blade holder and said clamping plate; and,
    securing means threadably engaging said collar for pressing said clamping plate and said end portion against the inside wall of said collar thereby pressing the blade tightly between said clamping plate and said spaced apart cut wall portions; the inner wall radius of said collar corresponding to the outer wall radius of said end portions thereby causing said inner wall of said collar to fully support said end portion when said securing means is adjusted to press said clamping plate against the blade seated on said cut wall portions.

4. The clamping arrangement of claim 3 comprising means for holding said collar on said end portion.

5. The clamping arrangement of claim 4 comprising ancillary means for loosely holding said clamping plate within said collar.

6. A clamp arrangement for clamping blades to the tubular saw-blade holder of a power driven saw comprising:
    surface means formed on the end portion of the saw-blade holder of the power driven saw for receiving the saw blade thereon; said end portion being defined by a cut-away section of said tubular holder, said surface means being the cut wall portions of said end portion;
    a clamping plate for clamping the blade to said surface means;
    a collar surrounding said end portion of the blade holder and said clamping plate; and,
    securing means threadably engaging said collar for pressing said clamping plate and said end portion against the inside wall of said collar thereby pressing the blade tightly between said clamping plate and said cut wall portions; the inner wall radius of said collar corresponding to the outer wall radius of said end portion thereby causing said inner wall of said collar to fully support said end portion when said securing means is adjusted to press said clamping plate against the blade seated on said cut wall portions;

said securing means being an annular member defining a clear passage therethrough; said plate having an opening formed therein substantially in line with said passage thereby facilitating access to the shank portion of the saw blade held between said clamping plate and said surface means whereby said shank portion can be easily removed from between said clamping plate and surface means with aid of an instrument passed through said clear passage and said opening in said plate in the event the saw blade should break off at the shank.

7. The clamping arrangement of claim 6 comprising means for holding said collar on said end portion.

8. The clamping arrangement of claim 7 comprising ancillary means for loosely holding said clamping plate within said collar.

9. A clamp arrangement for clamping a saw blade to the tubular saw blade holder of a power driven saw wherein the saw blade has a cutting portion extending beyond the shank portion, the cutting portion having a greater cross-sectional area than the shank portion, the clamp arrangement comprising:

surface means formed on the end portion of the blade holder of the power driven saw for receiving the saw blade thereon; said end portion being defined by a cut-away section of said tubular saw-blade holder, said cut-away section defining two spaced apart cut wall portions of the tubular saw-blade holder, said cut-wall portions being said surface means and extending in the longitudinal direction of the saw-blade holder;

a clamping plate coextensive with said cut-away section interposed between said securing means and the shank portion of the blade for clamping the shank portion of the saw blade against said cut wall portions;

a collar surrounding said end portion of the blade holder and said clamping plate; and, securing means engaging said collar for pressing the shank portion of the saw blade against said cut wall portions, said end portion being, in turn, pressed at its outer surface against the inner wall of said collar by said securing means;

said clamping plate and said end portion have respective lengths greater than the shank portion of the saw blade whereby said clamping plate and said end portion coact to clamp the saw blade also at the cutting portion thereof.

10. A clamp arrangement for clamping blades to the tubular saw-blade holder of a power driven saw comprising:

surface means formed on the end portion of the blade holder of the power driven saw for receiving the saw blade thereon; said end portion being defined by a cut-away section of said tubular saw-blade holder, said surface means being the cut wall portions of said end portion;

a collar surrounding said end portion of the saw-blade holder;

securing means engaging said collar for pressing the shank portion of the saw blade against said cut wall portions, said end portion being, in turn, pressed at its outer surface against the inner wall of said collar by said securing means; and, a clamping plate interposed between said securing means and the shank portion of the blade for clamping the shank portion of the saw blade against said cut wall portions;

said securing means being an annular member threadably engaging said collar and defining a clear passage therethrough, said clamping plate having an opening formed therein substantially in line with said passage thereby facilitating access to the shank portion of the saw blade held between said clamping plate and said surface means whereby the shank portion can be easily removed from between said clamping plate and said surface means with the aid of an instrument passed through said clear passage in the event the saw blade should break off at the shank.

11. The clamp arrangement of claim 10 wherein: the saw blade has a cutting portion extending beyond the shank portion, the cutting portion having a greater cross-sectional area than the shank portion, and, wherein: said clamping plate and said end portion have respective lengths greater than the shank portion of the saw blade whereby said clamping plate and said end portion coact to clamp the saw blade also at the cutting portion thereof.

12. In a portable power driven saw having a motor driven reciprocating saw-blade holder, a housing arranged in surrounding relation to said saw-blade holder, and a clamping arrangement for clamping a saw blade to the saw-blade holder within said housing, the clamping arrangement comprising:

surface means formed on the end portion of the blade holder for receiving the saw blade thereon;

a collar surrounding said end portion of the blade holder;

securing means engaging said collar for pressing the saw blade and said end portion against the inside wall surface of said collar thereby pressing the blade tightly between said securing means and said surface means; and, access means formed in the wall of the housing at the immediate vicinity of said securing means for facilitating access to said securing means;

said securing means being an annular member defining a clear passage therethrough substantially in line with said access means thereby facilitating access to the shank portion of the saw blade held between said securing means and said surface means whereby said shank portion can be easily removed from between said securing means and said surface means with aid of an instrument passed through said access means and said clear passage in the event the saw blade should break off at the shank.

13. In a portable power driven saw having a motor driven reciprocating saw-blade holder, a housing arranged in surrounding relation to said saw-blade holder, and a clamping arrangement for clamping a saw blade to the saw-blade holder within said housing, the clamping arrangement comprising:

surface means formed on the end portion of the blade holder for receiving the saw blade thereon;

a clamping plate for clamping the blade to said surface means;

a collar surrounding said end portion of the blade holder and said clamping plate;

securing means engaging said collar for pressing said clamping plate and said end portion against the inside wall of said collar thereby pressing the blade tightly between said clamping plate and said surface means; said securing means being an annular member defining a clear passage therethrough; and, access means formed in the wall of the housing at the immediate vicinity of said securing means for facilitating access to said securing means;

said plate having an opening formed therein substantially in line with said passage thereby facilitating access to the shank portion of the saw blade held between said clamping plate and said surface means whereby the shank portion can be easily removed from between said clamping plate and said surface means with the aid of an instrument passed through said access means, said clear passage and said opening in said plate in the event the saw blade should break off at the shank.

14. In a portable power driven saw having a motor driven reciprocating saw-blade holder, a housing arranged in surrounding relation to said saw-blade holder, and a clamping arrangement for clamping a saw blade to the tubular saw-blade holder within said housing, the clamping arrangement comprising:

surface means formed on the end portion of the blade holder for receiving the saw blade thereon; said end portion being defined by a cutaway section of the tubular holder, said cut-away section defining two spaced apart cut wall portions of the tubular saw-blade holder, said cut-wall portions being said surface means and extending in the longitudinal direction of the saw-blade holder;

said end portion being defined by a cut-away section of said tubular member, said surface means being the cut wall portions of said end portion;

a clamping plate coextensive with said cut-away section for clamping the blade to said surface means;

a collar surrounding said end portion of the blade holder and said clamping plate;

securing means threadably engaging said collar for pressing said clamping plate and said end portion against the inside wall of said collar thereby pressing the blade tightly between said clamping plate and said surface means; the inner wall radius of said collar corresponding to the outer wall radius of said end portion thereby causing said inner wall of said collar to fully support said end portion when said securing means is adjusted to press said clamping plate against the blade seated on said surface means; and, access means formed in the wall of said housing at the immediate vicinity of said securing means for facilitating access to said securing means.

15. The clamping arrangement of claim 14 wherein: the saw blade has a cutting portion extending beyond the shank portion, the cutting portion having a greater cross-sectional area than the shank portion, and, wherein: said clamping plate and said end portion have respective lengths greater than the shank portion of the saw blade whereby said clamping plate and said end portion coact to clamp the saw blade also at the cutting portion thereof.

16. The clamping arrangement of claim 14 comprising means for holding said collar on said end portion.

17. The clamping arrangement of claim 16 comprising ancillary means for loosely holding said clamping plate within said collar.

18. In a portable power driven saw having a motor driven reciprocating saw-blade holder, a housing arranged in surrounding relation to said saw-blade holder, and a clamping arrangement for clamping a saw blade to the tubular saw-blade holder within said housing, the clamping arrangement comprising:

surface means formed on the end portion of the blade holder for receiving the saw blade thereon;

said end portion being defined by a cut-away section of said tubular saw-blade holder, said surface means being the cut wall portions of said end portion;

a clamping plate for clamping the blade to said surface means;

a collar surrounding said end portion of the blade holder and said clamping plate;

securing means threadably engaging said collar for pressing said clamping plate and said end portion against the inside wall of said collar thereby pressing the blade tightly between said clamping plate and said surface means; the inner wall radius of said collar corresponding to the outer wall radius of said end portion thereby causing said inner wall of said collar to fully support said end portion when said securing means is adjusted to press said clamping plate against the blade seated on said surface means; and, access means formed in the wall of said housing at the immediate vicinity of said securing means for facilitating access to said securing means;

said securing means being an annular member defining a clear passage therethrough said plate having an opening formed therein substantially in line with said passage thereby facilitating access to the shank portion of the saw blade held between said clamping plate and said surface means whereby said shank portion can be easily removed from between said clamping plate and surface means with aid of an instrument passed through said access means, said clear passage, and said opening in said plate in the event the saw blade should break off at the shank.

19. The clamping arrangement of claim 18 comprising means for holding said collar on said end portion.

20. The clamping arrangement of claim 18 comprising ancillary means for loosely holding said clamping plate within said collar.

21. The clamping arrangement of claim 18 wherein: the saw blade has a cutting portion extending beyond the shank portion, the cutting portion having a greater cross-sectional area than the shank portion, and, wherein: said clamping plate and said end portion having respective lengths greater than the shank portion of the saw blade whereby said clamping plate and said end portion coact to clamp the saw blade also at the cutting portion thereof.

* * * * *